United States Patent [19]
Kriek

[11] Patent Number: 5,354,243
[45] Date of Patent: Oct. 11, 1994

[54] VARIABLE RATIO CHAIN DRIVE EMPLOYING SYNCHRONOUS FLEXIBLE SPROCKET SHIFTING

[76] Inventor: Albert P. Kriek, 161 Chestnut Ridge Rd., Arden, N.C. 28704

[21] Appl. No.: 150,415
[22] Filed: Nov. 9, 1993
[51] Int. Cl.⁵ .................. F16H 55/30; F16H 7/00
[52] U.S. Cl. ........................ 474/160; 474/135
[58] Field of Search ................ 474/95–99, 474/152, 155–157, 160, 101, 117, 133, 135

[56] References Cited

U.S. PATENT DOCUMENTS

| | | | |
|---|---|---|---|
| 2,429,008 | 10/1947 | Wolfe | 474/162 |
| 3,106,101 | 10/1963 | Harriman | 474/162 |
| 3,492,883 | 2/1970 | Maeda. | |
| 4,127,038 | 11/1978 | Browning | 474/160 X |
| 4,580,997 | 4/1986 | Browning et al. | |
| 4,592,738 | 6/1986 | Nagano | 474/80 |
| 4,894,046 | 1/1990 | Browning. | |
| 5,012,632 | 5/1991 | Kuhn et al. | 474/135 X |
| 5,026,326 | 6/1991 | Pollich et al. | 474/135 X |
| 5,073,152 | 12/1991 | Browning | 474/162 |
| 5,205,794 | 4/1993 | Browning | 474/160 |
| 5,213,550 | 5/1993 | Wu | 474/160 |

*Primary Examiner*—Michael Powell Buiz
*Attorney, Agent, or Firm*—Carter and Schnedler

[57] ABSTRACT

A variable speed ratio multiple sprocket and chain drive, particularly applicable to bicycles, using stacks of resilient sprocket rings, each of which is radially split to define resilient sectors. For shifting, the resilient sectors are axially deflected so that the rows of teeth of adjacent sprockets are aligned with one another, thereby permitting a roller chain entrained around one sprocket ring to transfer to an adjacent sprocket ring of different pitch diameter, thus changing the drive ratio. A control system is mechanically linked to a resilient sector deflection mechanism. The control system tracks which driving sprocket ring and which driven sprocket ring are engaged by the chain, and selects either the stack of driving sprocket rings or the stack of driven sprocket rings for shifting so as to allow a rider to change the drive ratio up or down at will.

27 Claims, 6 Drawing Sheets

VARIABLE RATIO CHAIN DRIVE EMPLOYING SYNCHRONOUS FLEXIBLE SPROCKET SHIFTING

BACKGROUND OF THE INVENTION

The present invention relates generally to variable ratio roller chain drives such as are commonly employed on bicycles and, more particularly, to variable ratio roller chain drives which can be shifted under load.

Perhaps the most common variable speed ratio roller chain drive employed on bicycles is usually termed the derailleur system. The derailleur system has a stack of sprocket rings on the rear wheel, usually referred to as either free-wheel cogs or sprockets, and a stack of sprocket rings on the pedal shaft, usually referred to as chain rings. The free-wheel sprockets typically can number as many as eight, and chain rings usually number either two or three.

To compensate for the change in length of chain path as various pairs of driving and driven sprocket rings are entrained by the chain, a chain tightener is mounted in the slack pass of the chain near the rear wheel. The chain tightener typically comprises a pivoted, spring loaded pair of small sprockets S-wrapped by the chain, and is mounted on a parallelogram linkage such that it can be moved laterally, i.e., in a direction parallel to the rear wheel shaft.

The chain tightener also serves the purpose of effecting shifting, and is referred to as the rear derailleur. Thus the bicycle rider, by means of a suitable lever and cable device, laterally moves the pair of tightener sprockets comprising the rear derailleur while the chain is traveling, thereby exerting a lateral force on the chain. This causes the chain to jump in the direction of the lateral force from the sprocket about which it is wrapped to an adjacent sprocket. Since the sprocket thereby newly entrained is of a different pitch diameter, i.e., a different number of teeth, than the sprocket previously entrained, the driving ratio of the driving chain ring with reference to the driven free-wheel sprocket is changed.

Similarly, there is a lever and cable operated device called the front derailleur, which straddles the chain on its tight, or loaded pass in a location where the chain as it travels approaches the chain ring stack. The front derailleur likewise can be moved laterally so as to cause the chain to jump from one chain ring to another of different pitch diameter, thereby again changing the driving ratio.

Mechanical stops on both the front and rear derailleurs prevent the chain from being pushed off the extreme inboard and outboard sprocket rings of each stack.

A refinement of the derailleur system, generally called index shifting, utilizes detents in the lever mechanism to which the cable operating either the rear or the front derailleur is connected. The detents are spaced such that the interval through which the derailleur is moved laterally ideally transfers the chain accurately from one sprocket ring to another selected by the rider.

The system summarized above has the following four disadvantages in particular:

(1) A roller chain, while able to flex freely in the plane in which it and its entrained sprockets operate, is not designed to flex in a direction perpendicular to that plane. Hence, exerting a lateral force on the chain, i.e., a force perpendicular to the plane of operation, creates undesirable stresses and produces excessive wear in the chain.

(2) The lever and cable mechanisms which operate the front and rear derailleurs are subject to wear and dimensional distortion. Further, because of the mechanical advantage inherent in the parallelogram linkages which allow both rear and front derailleur to move laterally, a very small travel of the cable produces a relatively large movement of the derailleur. Consequently, the mechanisms are sensitive and prone to needing readjustment, particularly if subjected to frequent or heavy use.

(3) In transferring from one sprocket to another, the chain rollers usually do not fall immediately in the grooves of the newly entrained sprocket. More often than not, the rollers must ride over the crests of several successive sprocket teeth before falling in the grooves. It is not unusual for a receiving sprocket to rotate through more than 270° before the chain meshes with it properly. Not only does this aggravate chain and sprocket wear, but it creates a lack of shifting precision and an undesirable distance of bicycle travel before the newly selected drive ratio is achieved.

(4) Index shifting works reasonably well on the free-wheel sprockets. This is not only because it operates on the slack pass of the chain, but also because the free-wheel sprockets are smaller in pitch diameter than the chain rings and therefore the transfer from one sprocket to an adjacent one takes place through a relatively small radial displacement. With the chain ring stack, however, accurate index shifting is more difficult. First of all, the transfer must be done with the tight pass of the chain, i.e., the pass which transmits the driving load. This makes lateral deflection of the chain more difficult. Moreover, the radial displacement from one chain ring to an adjacent one is much greater than it is with the free-wheel sprockets. This greater radial displacement makes chain transfer particularly difficult when transferring from a smaller to a larger diameter chain ring. Such a transfer normally requires that the chain be laterally deflected more to effect the transfer than the lateral displacement which is required once the transfer has been achieved. The front derailleur may therefore continue to drag against the chain after transfer, and achieving the transfer is often accompanied by an extended period during which the chain and sprocket are not properly meshed, and by undesirable chatter of the chain before it finally transfers to the receiving sprocket.

Alternatives to the derailleur system have been proposed, for example in Browning U.S. Pat. Nos. 4,127,038, 4,894,046 and 5,073,152, and in Browning et al U.S. Pat. No. 4,580,997. These Browning and Browning et al patents disclose bicycle shifting mechanisms which involve hinged sprocket sectors arranged such that the hinged sprocket sector can pick up the chain load from an adjacent sprocket in a sprocket stack, and have the characteristic of being able to shift under load. A disadvantage of the Browning and Browning et al mechanisms, however, is that a relatively wide space in the axial direction is required if a number of individual sprockets are to be included for a range of gear ratio. There is limited axial space available in a bicycle; a typical standard rear wheel fork is only 130 mm in width. Another disadvantage of some of the Browning and Browning et al mechanisms is a tendency to force a sharp lateral bend of the chain at the hinge point. Yet another disadvantage is that the relatively complex mechanism involved is not enclosed, making it more susceptible to contamination.

SUMMARY OF THE INVENTION

Accordingly, it is an object of the invention to provide a variable ratio chain drive, particularly for a bicycle, which can be shifted under load.

It is a related object of the invention to provide a variable ratio chain drive wherein, during shifting, the chain is transferred from one sprocket ring to another essentially synchronously, that is, in a manner such that the chain rollers mesh perfectly within, at the most, five or six chain pitches after the chain makes contact with the receiving sprocket ring, regardless of whether the chain transfer is to a relatively smaller or to a relatively larger sprocket ring.

It is another object of the invention to provide a variable ratio chain drive, particularly for a bicycle, wherein precise shifting from one drive ratio to another is accomplished within a minimum of bicycle travel distance, and regardless of whether the chain is under no load or heavy load.

It is another object of the invention to provide a variable ratio chain drive including a stack of relatively closely-spaced sprocket rings such that a number of drive ratios can be accommodated within the width of a standard bicycle rear fork.

It is another object of the invention to provide a variable ratio chain drive wherein no appreciable lateral force is imposed on the chain during shifting, and lateral deflection of the chain is kept to a minimum.

It is a related object of the invention to provide a variable ratio chain drive which requires little or no adjustment during its operational life.

It is still another object of the invention to provide a shift control mechanism which is easily operated by the rider.

It is a related object of the invention to provide a single operating lever, preferably mounted on the handle bar, which can be manipulated by the rider in either one direction or the other for shifting up or down.

It is a related object of the invention to provide a shift control mechanism which automatically tracks which of the free-wheel sprockets and which of the chain rings is engaged by the chain at any given time, and automatically selects the next appropriate one of the stack of free-wheel sprockets or the stack of chain rings as is appropriate for a particular shift in drive ratio.

Briefly stated, these and other objects are addressed by the present invention which provides a variable ratio chain drive including a sprocket ring stack including at least two adjacent sprocket rings of differing diameters mounted for co-rotation on a sprocket axis. Typically, there is a driving sprocket ring stack and a driven sprocket ring stack.

In accordance with one aspect of the invention, each of the sprocket rings is resilient and is radially split in a common plane defined by the corresponding sprocket axis and a radial such that the sprocket ring has a leading and a trailing resilient sector on either side of a sprocket ring split. For each of the driving and driven sprocket ring stacks, there is an actuator element for selectively deflecting the leading resilient sectors in one axial direction to a deflected position while deflecting the trailing resilient sectors in the opposite axial direction to a deflected position such that the leading resilient sector of one sprocket ring is in alignment with the trailing resilient sector of an adjacent sprocket ring at the common plane. The sprocket rings have circumferential teeth which engage the rollers of the chain as the chain is transferred from one sprocket ring to another sprocket ring as the sprocket ring stack rotates on the sprocket axis while the resilient sectors are in the respective deflected positions. Thus, as the sprocket rings rotate, the chain transfers smoothly, and under load, from the trailing resilient sector of the one sprocket ring to the leading resilient sector of an adjacent sprocket ring.

To provide upshifts as well as downshifts, the actuator element is selectively operable either to deflect the sectors to respective deflected positions such that the leading resilient sector of a relatively larger diameter sprocket ring is in alignment with the trailing resilient sector of a relatively smaller diameter sprocket ring, or to deflect the sectors to respective deflected positions such that the leading resilient sector of a relatively smaller diameter sprocket ring is in alignment with the trailing resilient sector of a relatively larger diameter sprocket ring.

In order to prevent the chain from running off in the event the resilient sectors remain in the deflected position after the chain has been shifted to either of the outer sprocket rings of a stack, which can occur particularly when an automatic shift control mechanism is not provided, there may be a deflector tab on the trailing flexible sector of each of the outer sprocket rings so located and oriented as to prevent the chain from running off under such conditions.

The sprocket ring stack with resilient, radially split sprocket rings may comprise either the driving sprocket ring stack, the driven sprocket ring stack, or both. Thus, the sprocket ring stack comprising resilient, radially split sprocket rings may be employed on one axis in combination with and interconnected by a chain to a variable speed drive on another axis which does not employ such a stack of resilient, radially split sprocket rings. The variable speed drive on the other axis may, for example, be a derailleur system or a planetary gear system. In a full implementation of the invention, both the driving and the driven sprocket ring stacks comprise resilient, radially split sprocket rings.

The sprocket rings are mounted about a hub, and the resilient sectors have sprocket spokes extending radially inwardly towards the hub. To accommodate the movement of deflection, there are radial gaps between the sprocket spokes and the hub when a corresponding resilient sector is unloaded. These radial gaps are sized such that a given sprocket spoke contacts the hub when the corresponding resilient sector is subjected to the load of a chain. The actuator element is operable to deflect the sectors only during a portion of a rotational cycle when the flexible sectors are not subjected to the load of a chain.

In addition, there are circumferential gaps in the sprocket rings as a result of the radial split in the common plane. These circumferential gaps in the sprocket rings inherently decrease as the resilient sector sprocket spokes contact the hub under chain load. Such decrease in circumferential gap results in a localized change in sprocket ring circumference. However, the change in sprocket ring circumference as the resilient sector sprocket spokes contact the hub under chain load is insufficient to interfere significantly with proper meshing of the chain with the sprocket ring.

Each tooth on the sprocket rings has a leading edge and a trailing edge with reference to the normal direction of rotation. In accordance with another aspect of the invention, the teeth are angularly oriented with respect to the common plane such that the rollers of the chain, when transferring from the leading resilient sector of any given sprocket ring to the trailing resilient sector of an adjacent sprocket ring, always contact the leading edges of the teeth of the trailing resilient sprocket sector upon initial contact with the trailing resilient sector, regardless of whether the given sprocket ring is of a larger or a smaller diameter compared to the adjacent sprocket ring. Thus, shifting is accomplished essentially synchronously, that is to say, the chain rollers mesh perfectly within, at the most, five or six chain pitches after the chain makes contact with the receiving sprocket, regardless of whether the transfer is to a smaller or a larger sprocket. Significantly, the chain rollers are never required to climb over the crest of any tooth before perfect mesh is achieved, resulting in shifting from one drive ratio to another quickly and precisely, regardless of whether the chain is under no load or heavy load. For example, if it is desired to shift from a smaller to a larger chain ring while still climbing uphill with high driving tension on the chain, this is accomplished just as easily, quickly and precisely as shifting from a larger to a smaller free-wheel sprocket while pedaling downhill with essentially no driving load on the chain.

In accordance with another aspect of the invention, an actuator mechanism is connected to the actuator element, and the actuator mechanism is preferably substantially enclosed within a chain ring hub defining an interior space and thereby protected from contamination. In the case of a variable ratio chain drive which includes a driving sprocket ring stack with resilient, radially split sprocket rings and a driven sprocket ring stack with resilient, radially split sprocket rings, there correspondingly are a driving sprocket actuator mechanism and a driven sprocket actuator mechanism. Each actuator mechanism has at least one operating member and is operable, when the operating member is urged in a direction indicating a shift is desired, to cause the actuator element to deflect the resilient sectors while the resilient sectors are not subjected to the load of a chain such that chain transfer subsequently occurs when the resilient sectors are subjected to chain load, and to subsequently release the resilient sectors while the resilient sectors are again not subjected to chain load. The actuator mechanism is further operable, upon release of the resilient sectors, to move the operating member back to a neutral position, indicating that chain transfer has been completed.

In one form, the actuator mechanism has a pair of operating members. One of the operating members effects downshifts, and subsequently indicates that a chain transfer for downshift has been completed. The other of the operating members effects upshifts, and subsequently indicates that a chain transfer for upshift has been completed.

In accordance with yet another aspect of the invention, the actuator element preferably is in the form of a rotatable spur having a radially oriented axis of rotation lying in the common plane where the sprocket rings are radially split, and having two diametrically-opposed spur teeth straddling the common plane. One of the spur teeth projects into a space between two adjacent leading resilient sectors of the sprocket ring stack, and the other of the spur teeth projects into a space between two adjacent trailing resilient sectors of the sprocket ring stack. The sprocket rings are mounted about a hub having a cylindrical wall defining the interior space. The spur is attached to a shaft, which extends radially inwardly through an aperture in the cylindrical wall for engagement with the actuator mechanism within the interior space (and thus protected from contamination). Specifically, the spur shaft is attached to a crank having a crank pin which engages the actuator mechanism. The actuator mechanism in particular is operable, when a shift is desired, to rotate the spur on the spur axis so as to cause sprocket resilient sector deflection and subsequent resilient sector release while the resilient sectors are cyclically not subjected to the load of a chain.

In a more particular embodiment of the invention, the actuator mechanism within the hub interior space includes a yoke having a yoke outer rim in engagement with the crank pin so as to be driven in rotation about a common axis with the hub by the crank pin as the crank pin rotates with the hub. The yoke is free to move back and forth in a direction parallel to the common axis such that axial yoke movement is converted to back and forth rotation of the spur crank about the spur axis of rotation to cause the spur teeth to deflect the leading and trailing resilient sectors. Mounted on the yoke concentrically with the common axis of the hub and the yoke is a cylindrical cam having a pair of grooves in a cylindrical surface. The cylindrical cam is axially restrained by the yoke, but is free to rotate on the yoke about the common axis. There is a spring-loaded ratchet and pawl mechanism mounted between mating cylindrical walls of the yoke and the cam for transmitting driving force from the yoke to the cam so as to rotationally drive the cam in a normal rotational direction only, while allowing the cam to rotate on the yoke relative to the yoke and in opposite rotational direction. The ratchet of the ratchet and pawl mechanism has only one notch so that, when driven, the cam always maintains the same relative angular position with respect to the yoke.

The actuator mechanism additionally includes a pair of cam followers having rollers arranged generally with their axes radially disposed with respect to the cam and mounted on cam follower arms for selective engagement with the cam grooves. The cam follower arms are attached to cam follower arm shafts whose axes are parallel to the axis of the hub, but not concentric therewith. The cam follower arm is rotatably mounted but axially restrained with reference to a stationary endpiece comprising an end of the hub interior space. The ends of the cam follower arm shafts opposite to the cam arms extend outside the hub. The arrangement is such that selectively controlled rotation of either of the cam follower arm shafts effects engagement of the corresponding cam follower with the corresponding cam groove.

The cam grooves are shaped and oriented such that, when one of the cam grooves is engaged by the corresponding cam follower, axial displacement of the cam results so as to cause sprocket resilient sector deflection and subsequent resilient sector release while the resilient sectors are cyclically not subjected to the load of a chain, and such that the engaging cam follower causes the flexible sectors, while in the deflected position, to transfer the chain from one sprocket to another. To effect resilient sector release, there are a respective pair of ramps on the cam grooves. The ramps are arranged to eject the cam followers from the cam groove. Ejection of one of the cam followers from the corresponding groove causes a rotation of the end of the corresponding cam follower shaft extending outside the hub, which rotation serves to indicate that chain transfer has been completed.

Another aspect of the invention is the provision of convenient and effective shift control mechanisms which, among other things, automatically track the engagement of the chain with particular ones of the sprocket rings. To facilitate this operation, each actuator mechanism is further operable, upon release of the resilient sectors, to move the particular operating member which effected the shift back to a neutral position, indicating that chain transfer has been completed.

As noted hereinabove, the invention provides a shift control mechanism in combination with the variable ratio chain drive, which shift control mechanism is operably connected, such as through a cable, to the operating member. The shift control mechanism is operable, in response to a control input, to urge the operating member to indicate a shift is desired, and is operable to respond to movement of the operating member back to a neutral position to record the completion of a shift and to track the particular sprocket ring to which the chain has been transferred. The shift control mechanism is further operable to inhibit further urging of the operating member when the chain has reached an outer sprocket ring of the stack. In the case of a variable ratio chain drive which includes a driving sprocket ring stack with resilient, radially split sprocket rings and a driven sprocket ring stack with resilient, radially split sprocket rings, these correspondingly are a driving sprocket shift control mechanism and a driven sprocket shift control mechanism.

In a more particular embodiment of the invention, the shift control mechanism, or each of the shift control mechanisms, includes a differential gear set including two bevel sun gears having a sun gear common axis. The sun gears engage a pinion rotatably mounted on a shaft arm. The shaft arm is rotatably mounted on the sun gear common axis. The sun gears have hubs with indentations spaced at equal angular intervals, the indentations comprising detents which tend to hold the sun gears at discrete angular positions. There is a pair of crank pin drivers, each fitted with a crank pin, rotatably and concentrically mounted on respective sun gear hubs, with a ratchet device coupling each crank pin driver to its respective sun gear hub such that each crank pin driver is free to rotate freely on its respective sun gear hub in a free-turning direction, and rotatably drives the respective sun gear in a driving direction. The ratchet devices have drive engagement positions spaced at the same angular intervals as the detent indentations, and the driving directions of the crank pin drivers are rotationally opposite with respect to each other.

The crank pins are connected to respective ones of the operating members such that rotating each crank pin driver through the angular interval in the free-turning direction moves the operating member so as to cause a shift, and such that movement of the operating member back to the neutral position upon shift completion causes rotation of the crank pin driver in the driving direction through the discrete angular interval to drive the corresponding sun gear through the same angle, thereby rotating the pinion shaft arm through one-half the angular interval to register completion of the shift, and such that the rotation by the pinion shaft arm to register a shift in one direction can be offset by an equal and opposite rotation of a shift in the other direction such that the angular position of the pinion shaft arm upon any shift completion indicates which sprocket of the sprocket shaft stack is currently engaged by the chain.

There are two latches, one for each of the crank pin drivers, located so as to be actuated by the pinion shaft arm when it reaches a limit position such that the latches engage the crank pin drivers to prevent initiation of a shift which would cause the chain to run off either outer sprocket in the stack. There is also a shift initiation arm pivoting about the sun gear common axis and arranged for engaging the crank pin driver such that rotation in either direction of the shift initiation arm about the sun gear common axis causes rotation of one crank pin driver or the other to initiate the shift.

In accordance with another aspect of the invention, there is provided a common shift selector mechanism connected to the two shift control mechanisms. The shift selector mechanism is operable to effect a shifting sequence which alternately employs the driving sprocket ring stack and the driven sprocket ring stack for successive shifts in a given driving ratio direction.

The shift control system of the invention has the advantage of convenience and ease of operation. A single operating lever, preferably mounted on the bicycle handlebar, is manipulated by the rider clockwise or counterclockwise for shifting up or down in drive ratio, respectively. With the mechanism of the invention, once shifting is initiated by the operating lever, further operation of the shifting mechanism is automatic, and progresses up or down sequentially through the drive ratios until the operating lever is released. When the maximum or minimum drive ratio (high gear or low gear in transmission terminology) is reached, the operating lever is returned to its neutral position by the control mechanism and further shifting is automatically prevented.

In a particular embodiment of the invention, the shift selector mechanism includes a differential gear set including two beveled sun gears having a sun gear common axis and having respective hubs. The sun gear of the shift selector mechanism engages a pinion rotatably mounted on a shaft arm. The shaft arm in turn is rotatably mounted on the sun gear common axis, and each sun gear is rotatably driven by a respective one of the shift control mechanisms such that each sun gear assumes discrete angular positions which indicate the specific sprocket in the stack corresponding to each sun gear that is engaged by the chain and such that the discrete angular positions of the pinion shaft arm indicate which respective sprocket in each stack is engaged by the chain.

The shift selector mechanism additionally includes a cam which is coupled to and driven by the pinion shaft arm so as to rotate about the sun gear common axis. The pinion shaft arm is suitably shaped to engage two cam followers, and each of these cam followers can move independently of the other. The shape of the cam is such that each of the discrete positions it assumes as a result of being coupled to the pinion shaft arm causes the respective positions of the two cam followers to collectively signal which of the two sprocket stacks is to be utilized to effect the next shift, whether that shift is up or down in driving ratio.

The shift selector mechanism additionally has a pair of yokes, and each of the cam followers is rotatably mounted to a corresponding one of the yokes. The yokes pivot about respective fulcrums to form levers for transmitting translational motion of the cam followers to another point. There is a shaft rotatably mounted in and concentric with the sun gear hubs. The shaft supports the pinion shaft arm and also supports a shift arm rotatable thereon. The shift arm is attachable to a user operation device for rotation back and forth to activate up or down shifting as desired by the rider. Finally, there is a toggle fitted in the shift arm. The toggle is pivotable about an axis oriented in the plane of rotation of the shift arm. The toggle includes lobes and a detent arrangement which allows the lobes to assume two discrete positions. The positions are determined by contact of a roller attached to the toggle with the cam operated yokes, so that the two positions of the lobes poise the toggle to selectively activate one or the other of the shift control mechanisms to effect the desired upshift or downshift.

Another aspect of the invention is the provision of a chain tightener which floats laterally with the slack pass of the chain in the variable ratio chain drive of the invention. The chain tightener includes a pair of chain tightener sprockets mounted on an arm having a pivot for pivoting about an axis perpendicular to the plane of the chain path. The arm is spring loaded in such a way as to maintain a light but near constant chain tension. The arm and its pivot are mounted on one link of a freely articulating laterally oriented parallelogram linkage so located such that chain wrap around the driving and driven sprockets is approximately 180°, or less, on each. This allows for cyclical release from chain load for the resilient sectors during deflection and release of the resilient sectors.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
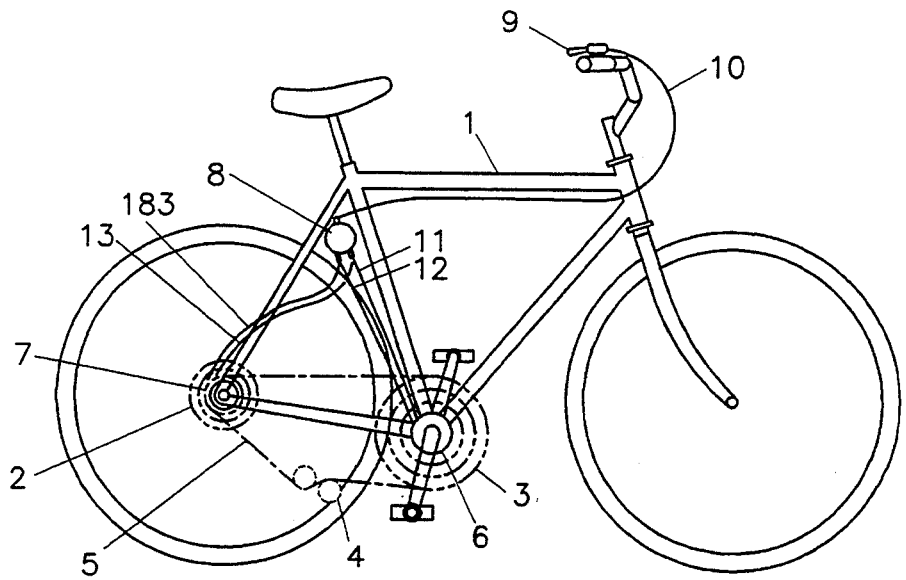
FIG. 1 is a general view of a bicycle showing the location of the components comprising this invention.

Referring first to FIG. 1, shown in overview is a bicycle frame 1 upon which are mounted a rotating stack of chain rings 3, a rotating stack of free-wheel sprockets 2 and a roller chain 5 selectively entrained around one of each of the chain rings 3 and free-wheel sprockets 2. Either or both of the stack of chain rings 3 and the free-wheel sprockets 2 may comprise resilient sector sprocket rings embodying the invention. Also included are a floating, spring loaded chain tightener 4, a chain ring hub assembly 6 supporting the chain rings 3, and a free-wheel sprocket hub assembly 7 supporting the free-wheel sprockets 2. For rider control, there are a modular shift control apparatus 8, an operating lever unit 9, a flexible cable and cable sheath assembly 10 which connects the operating lever unit 9 to the shift control apparatus 8, and flexible cable and cable sheath assemblies 11,12 and 13,183 which respectively connect the shift control apparatus 8 to the chain ring hub assembly 6 and the shift control apparatus 8 to the free-wheel sprocket hub assembly 7.

Figures 2, 3, 4:
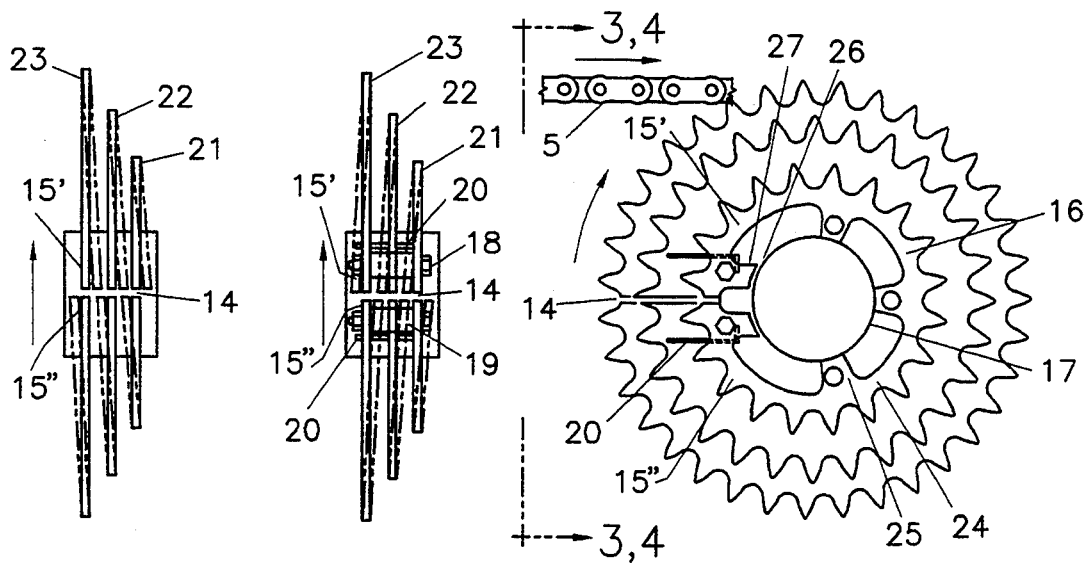
FIG. 2 is a side view of a sprocket ring stack in accordance with the invention.
FIG. 3 is an end view taken on line 3,4—3,4 of FIG. 2, during operation depicting resilient sector deflection such that a roller chain transfers from a relatively smaller diameter sprocket ring to a relatively larger diameter sprocket ring.
FIG. 4 is an alternative end view taken on line 3,4—3,4 of FIG. 2, during a converse operation, depicting resilient sector deflection such that the chain transfers from a relatively larger diameter sprocket ring to a relatively smaller diameter sprocket ring.

FIGS. 2-4 represent a sprocket ring stack in accordance with the invention, representative of either the stack of rear wheel free-wheel sprockets 2 or the stack of chain rings 3. As shown in FIGS. 2–4, each individual sprocket ring is radially split, defining sprocket splits 14 comprising relatively small (e.g. 0.8 mm) circumferential gaps 14. All the splits 14 of each stack are in a common plane defined by a radial and the sprocket axis.

On either side of each of the sprocket ring splits 14 are a leading resilient sector 15' and a trailing resilient sector 15", the terms "leading" and "trailing" being with reference to the direction of rotation during normal operation as indicated by the curved arrow in FIG. 2. Thus, assuming a fixed reference point past which the outer circumference of a sprocket ring rotates, the leading resilient sector 15' passes first, then the gap or split 14, and finally the trailing resilient sector 15".

Each of the resilient sectors 15' and 15" subtends an arc generally ranging from 90° to 100°, and can be deflected so that the split edge moves in a direction parallel to the sprocket axis, thus perpendicular to the plane of the sprocket ring 16 face. FIGS. 3 and 4 depict such deflections in opposite directions, the deflected positions being in phantom in FIGS. 3 and 4.

The remaining portion 16 of each sprocket ring, subtending 160° to 180°, defines a fixed or rigid sector 16 which does not deflect and which is rigidly fastened to a suitable flange (or flanges) on a common sprocket ring hub 17.

The resilient sectors 15' and 15" of the individual sprocket rings are connected to each other with an arrangement of a bolt and nut 18, spacers 19 and a brace 20 (FIGS. 2 and 3) so that the split edges of each stack move through the same axial displacement, and parallel with each other. If the opposing split edges are respectively displaced in axially opposite directions through a distance equal to one half the center-to-center spacing between adjacent sprockets, alternative configurations shown in phantom in FIGS. 3 and 4 result.

Figure 5A:
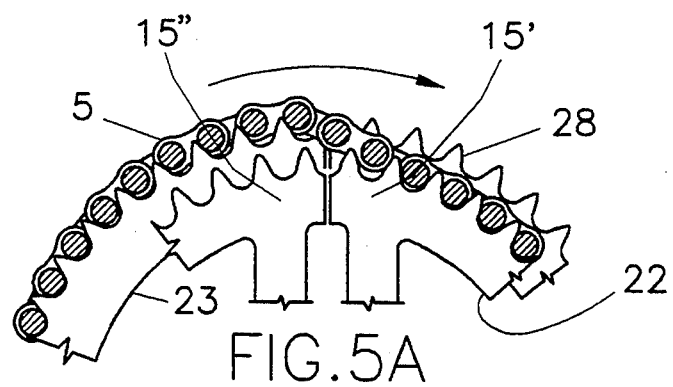
FIG. 5A corresponds to FIG. 3 and shows a typical transfer of the roller chain from a smaller to a larger sprocket ring.

Referring in particular to FIGS. 3 and 5A, if the chain 5 is currently entrained on sprocket ring 22 and the sprocket ring stack is rotated in the direction shown by the arrow while the leading and trailing resilient sectors 15' and 15" are deflected to the phantom line positions of FIG. 3, then the chain 5 is transferred from the leading resilient sector 15' of the sprocket ring 22 to the trailing resilient sector 15" of the relatively larger diameter sprocket ring 23. Conversely, and referring in particular to FIGS. 4 and 5B, if the chain 5 is currently entrained on sprocket ring 23 and the sprocket ring stack is rotated in the direction shown by the arrow while the leading and trailing resilient sectors 15' and 15" are deflected to the phantom line positions of FIG. 4, then the chain 5 is transferred from the leading resilient sector 15' of the sprocket ring 23 to the trailing resilient sector 15" of the relatively smaller diameter sprocket ring 22. In either case, once the chain 5 has been wrapped around the newly transferred to, or receiving, sprocket ring through an arc representing the normal wrap of the chain around that sprocket ring, the resilient sprocket sectors 15' and 15" are then allowed to return to their neutral, or undeflected, position, and the transfer, and therefore the shift to a new drive ratio, is completed.

As can be seen in FIG. 2, a typical sprocket ring includes a rim 24 around which sprocket teeth are located, and typical sprocket spokes 25 and 27 radially disposed toward the sprocket ring hub 17. The spokes 25 of the rigid sector 16 are fastened to the hub 17. However, the sprocket spokes 27 of the resilient sectors 15' and 15" are not connected to the hub 17, and a very small radial clearance or gap 26 is left between the outer rim of the hub 17 and the opposing inner circumferential surfaces of the sprocket spokes 27. This allows the resilient sectors 15' and 15" to freely deflect axially as long as no radial load is applied as a result of chain load which would tend to close the radial gap 26. As is described hereinbelow, as one aspect of the invention the axial deflection is effected during that portion of the sprocket ring rotation when the chain 5 is not entrained on the resilient sectors 15' and 15". In other words, the resilient sector offset required to provide shifting is produced while the resilient sectors 15' and 15" are cyclically unloaded. Likewise, returning the resilient sectors 15' and 15" to their neutral position after a shift has been completed is done while the resilient sectors 15' and 15" are cyclically unloaded. When the resilient sectors 15' and 15" are wrapped by the chain 5, particularly with a heavy driving load on the chain 5, the radial gaps 26 close so that the sprocket spokes 27 can provide the required radial support for the sprocket rim.

Typically, the sprocket rims are relatively thin (in the axial direction), on the order of 2 mm, but in the radial direction are relatively wide, ranging, approximately, from perhaps 6 mm to as much as 20 mm or more. This means that the sprocket rims can be made fairly flexible in the axial direction, but quite resistant to deflection in the radial direction. Consequently, it is possible in practice to make the radial clearance 26 between the sprocket spoke 27 and hub 17 so small that when the radial gaps 26 close under load and the circumferential gap 14 between the resilient sectors 15' and 15" at the split 14 is thereby also slightly reduced, the spacing between the two sprocket teeth immediately on each side of the split 14, i.e., the tooth pitch straddling the split, is not affected sufficiently to interfere with adequate meshing of the chain 5 across the split 14.

Figure 5B:
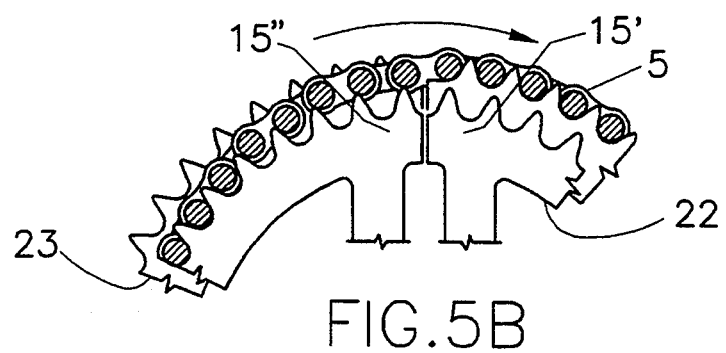
FIG. 5B corresponds to FIG. 4 and shows a typical transfer of the roller chain from a larger to a smaller sprocket ring.

As described hereinabove with reference also to FIGS. 3 and 4, FIGS. 5A and 5B show the relationship between the sprocket teeth and the chain rollers when chain transfer takes place, either from a relatively smaller to a relatively larger sprocket ring (FIG. 5A) or from a relatively larger to a relatively smaller sprocket ring (FIG. 5B). Physically, it is possible to locate the sprocket rings in a stack angularly with respect to each other (to index the sprocket rings) such that the chain rollers mesh perfectly with the sprocket grooves upon first contact with the receiving sprocket ring, when transferring in one direction only, e.g., from a relatively larger to an adjacent relatively smaller sprocket ring. However, if this is done, perfect meshing upon initial contact will not occur, in most cases, when transferring in the other direction, i.e., from the relatively smaller to the relatively larger adjacent sprocket ring. Because of inherent sprocket geometry, this turns out to be physically impossible.

However, in accordance with the invention, it has been determined that it is possible to index the sprocket rings in a stack in such a way that a satisfactory compromise is reached, as is in particular depicted in FIGS. 5A and 5B. Direction of rotation is as shown by the arrows. For purposes of explanation, that portion 28 of the tooth profile facing in the direction of sprocket rotation is called the leading tooth surface. By proper design, it is possible, with any practical combination of sprocket rings in a stack, to index the teeth of each sprocket ring with respect to the split 14 in such a way that, when the chain 5 is transferred to an adjacent sprocket ring in the stack in either direction, a chain roller initially always contacts a leading tooth surface on the trailing resilient sector 15" of the receiving sprocket ring 22 or 23. Since the roller is thus placed on a circle concentric with, but larger in circumference than, the pitch circle of the sprocket ring, the next roller to be laid down on the receiving sprocket ring is closer to the center of its companion groove than the first one. This improvement is progressive, and in practice it turns out that perfect meshing is accomplished within a maximum of six chain pitches, and in many cases only three or four. Therefore, the driving load is fully transferred to the receiving sprocket ring long before the chain 5 is released from the previously entrained sprocket ring. For practical purposes, this method of transferring the chain can therefore be considered as synchronous shifting.

Figures 6, 7:
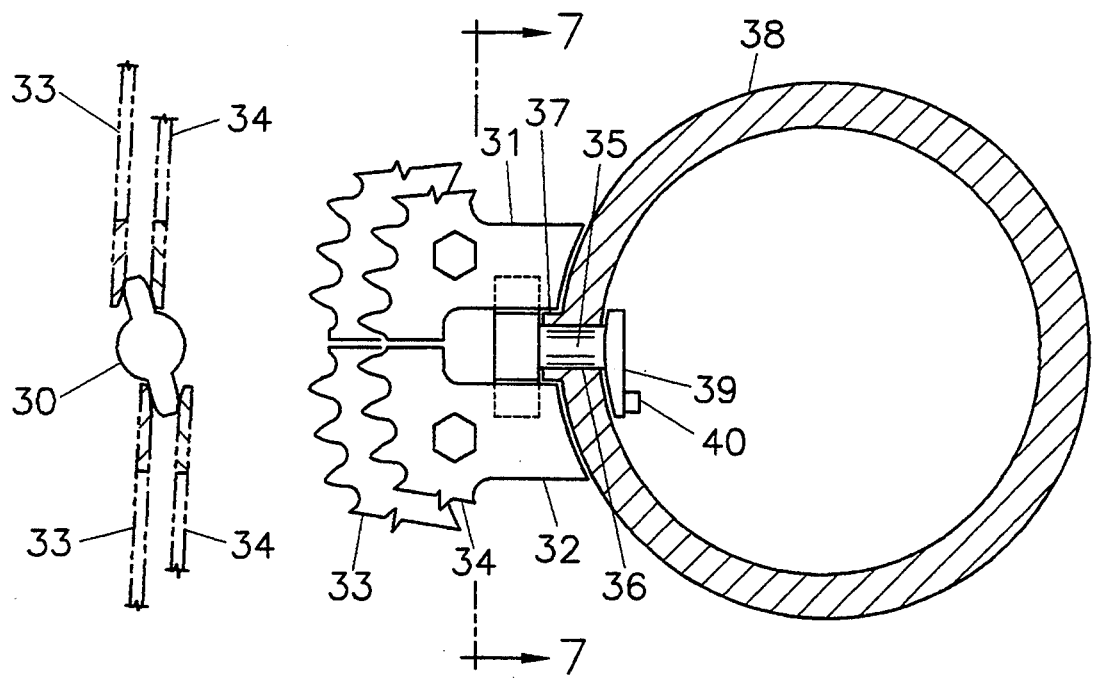
FIG. 6 is an axial view of a section taken through a typical sprocket hub.
FIG. 7 is a view, partly in section, taken on line 7—7 of FIG. 6.

FIGS. 6 and 7 show the mechanical element, which may be termed an actuator element, that produces the necessary resilient sprocket sector deflection. This deflection herein for convenience is alternatively termed sprocket offset.

Referring to FIGS. 6 and 7 in detail, the actuator element comprises a spur 30, which is in essence a spur gear with only two diametrically opposed teeth. The spur 30 is located between the sprocket spokes 31 and 32 astride the split and between two adjacent sprockets 33 and 34 in a stack. The spur 30 pivots about an axis 35 which is perpendicular to the common sprocket axes, and which is located in the plane of the split exactly midway between the two adjacent sprockets. A short shaft 36 attached to the spur 30 is free to rotate in a cylindrical bore centered in a boss 37 which forms an integral part of the wall of a hub 38 about which the sprockets are concentrically located. Within an interior space defined by the hub 38, crank arm 39 and crank pin 40 are attached to the inboard end of the spur shaft 36. Thus, if a force parallel to the hub 38 and sprocket common axes is applied to the crank pin 40, the spur 30 rotates, which in turn causes the sprocket edges on either side of the split to be displaced in opposing directions, thereby providing the desired sprocket offset. By rotating the spur 30 through the correct angle, which is achieved by the proper axial displacement of the crank pin 40, the configurations shown in FIG. 3 and FIG. 4 are selectively obtained.

Referring again to FIGS. 2 and 3, braces 20 hold the sprocket spokes 27 on either side of the split 14 in all the sprocket rings of a stack in such a way that the sprocket spokes 27 move parallel to each other during offset, while the sprocket spokes 27 are held together at a fixed spacing with reference to each other by spacers 19 and bolt and nut 18. A minute axial clearance is left between the spacers 19 and the spokes 27 to permit free deflection of the resilient sprocket sectors 15' and 15" or, in other words, to prevent the structure from being too rigid to allow deflection. The combination of the braces 20, spacers 19, and bolt and nut 18 force the sprocket split edges to remain perpendicular to the sprocket axes, and thus the rows of teeth of adjacent sprockets to remain equidistant, during sprocket offset.

The aforementioned proper displacement of the spur crank pin 40 is obtained by an actuator mechanism comprising a cam and cam follower. While similar in principle, the actuator mechanisms are somewhat different for the chain ring hub and the free-wheel hub.

Figure 8:
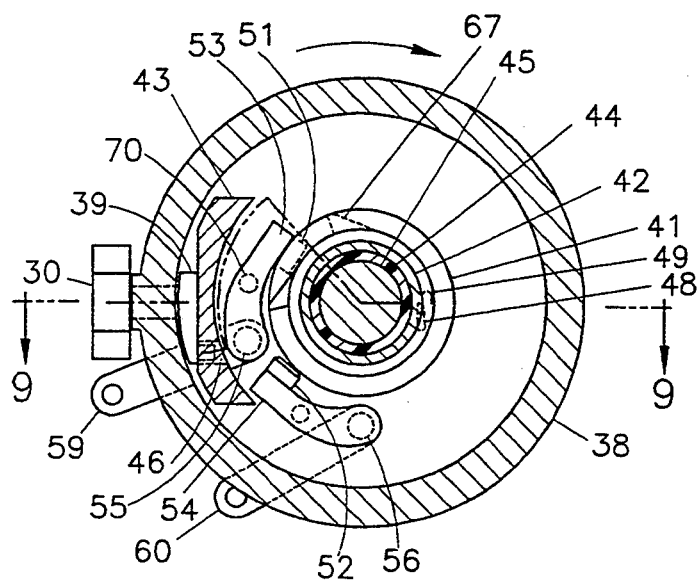
FIG. 8 is a view, mostly in section, showing the internal mechanism of a chain ring hub in accordance with the invention, taken on line 8—8 of FIG. 9.
Figure 10:
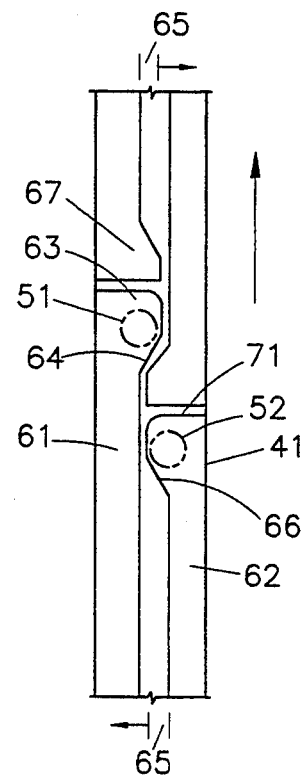
FIG. 10 is a developed view (rolled out flat) of the surface of a cylindrical cam in the chain ring hub of FIGS. 8 and 9.
Figure 9:
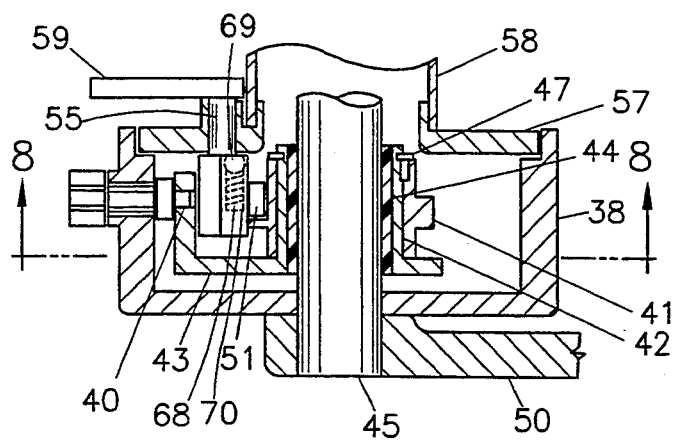
FIG. 9 is a view, mostly in section, taken on line 8—8 of FIG. 8.

FIGS. 8, 9, and 10 show an end view, cross-section, and developed view, respectively, of the chain ring actuator mechanism. A cylindrical cam 41 is mounted concentrically on the cylindrical barrel 42 of a yoke 43, which in turn is equipped with a concentric, internal bushing 44 which is free to slide axially on a pedal shaft 45. The bushing 44 is made of a self-lubricating low friction material such as glass-filled teflon or graphite-filled nylon. The rim of the yoke 43 has a close fitting oval hole 46 which fits around the crank pin 40. The cylindrical cam 41 is restrained from axial movement relative to the yoke 43 by retaining ring 47. However, the cam 41 is forced to rotate by a spring-loaded ratchet pawl 48 which in turn is rotatably driven by yoke 43 with which it is engaged by a single ratchet notch 49. The yoke 43 is in turn rotatably driven through engagement with the crank pin 40, which in turn is driven by the chain ring hub 38. The chain ring hub is fastened to and driven by a pedal shaft 45 and a pedal crank 50.

Rotating cylindrical cam followers 51 and 52 are mounted on respective arms 53 and 54. The arms 53 and 54 are attached to respective shafts 55 and 56 which can rotate in barrels that form a part of fixed hub plate 57 which is mounted concentrically with and fastened to a pedal shaft housing 58, which is a part of the bicycle frame. To the ends of shafts 55 and 56 away from arms 53 and 54 are attached operating members in the form of shift levers 59 and 60 respectively.

As viewed from the orientation of FIG. 8, applying clockwise torque to the shift levers 59 and 60 urges the cam followers 51 and 52 against the cylindrical surface of the cam 41, which contains shaped grooves 61 and 62. A developed view, i.e., a view of the cylindrical surface of the cam 41 rolled out flat, is shown in FIG. 10.

The cam followers 51 and 52 are so mounted as to be restrained from movement parallel to the pedal shaft 45 axis (which is also the hub 38 and sprocket axis). When, as the cam 41 rotates in the direction shown by the arrow in FIG. 10, point 63 in the cam groove 61 reaches cam follower 51, the torqued cam follower 51 drops into the groove 61. Continued rotation of the cam 41 then causes the slanted face 64 of the groove 61 to force the cam 41 to move axially through displacement 65. This displacement 65 is thus transmitted to the crank pin 40 to produce the desired sprocket offset or deflection, in this case resilient sector deflection which transfers the chain from a relatively smaller diameter to a larger diameter chain ring. Engaging cam follower 52 with slanted face 66 and subsequent rotation likewise produces cam displacement 65 and resilient sector deflection in the opposite direction, to transfer the chain from a relatively larger diameter to a relatively smaller diameter chain ring.

After cam follower 51 drops into the cam groove 61, cam 41 rotation continues until a radially oriented ramp 67, shown in FIGS. 8 and 10, reaches the cam follower 51. Further rotation then forces the cam follower 51 radially outward until it is no longer engaged in the cam groove 61. When that happens, the sprocket offset is released as the cam 41 is allowed to resume its centered position, to which it is returned by the leafspring effect of the deflected sprocket sectors 15' and 15" forcing them back to their normal, undeflected positions. The ramp 67 of the cam 41 is angularly located with respect to the slanted face 64 of the cam 41 so that the sprocket offset is held until the desired chain wrap about the receiving sprocket is completed. The slanted face 64 of the cam 41 is angularly oriented with respect to the sprocket split, and the cam follower 51 is angularly oriented with respect to the chain path, so that sprocket offset is achieved and released while the resilient sectors 15' and 15" are cyclically unloaded. It will be appreciated that the foregoing explanation holds for both cam followers 51 and 52 and their related cam surfaces.

As may be seen in FIG. 9, to provide a detent a compression spring 68 and metal ball 69 are inserted into a hole 70 in the arms of each of the cam followers 51 and 52. A pair of companion conical holes, into which the ball 69 can seat, is provided in hub plate 57 for each of the two balls 69, thereby creating detents for the arms of the cam followers 51 and 52 in their engaged and disengaged positions. Moreover, the arm shafts 53 and 54 are so located that the tangential load imposed by the cams 41 on the cam followers 51 and 52 does not produce a torque tending to disengage the cam followers 51 and 52 once they have begun to contact the cam grooves 61 and 62. Preferably, a slight engaging torque is produced. Thus, the cam followers 51 and 52 maintain their engaged or disengaged position, once either position is achieved, until a deliberate change is made.

As described hereinabove, the cam 41 is driven in rotation by a ratchet mechanism 48,49 mounted between it and the inner barrel of the yoke 43. The cam 41 is thereby driven in one direction only and is free to rotate independently in the other direction. The cam 41 is driven clockwise in the orientation of FIG. 8, which is the normal direction of rotation of the pedals and sprockets when the bicycle is driven forward. It is however possible, as a result of actions by the rider, for the cam follower 51 or 52 to be dropped into the cam 41 grooves 61 or 62 and for rotation to stop such that the cam follower 51 or 52 is not subsequently ejected from the cam groove 61 or 62. If the pedal, hub and chain ring assembly are inadvertently rotated in reverse, i.e., counterclockwise, as when the shift is not completed and the bicycle is pushed in reverse, then the transverse cam surface 71 can come back against the cam followers 51 or 52. If reverse rotation is thereafter forcibly continued, mechanical damage could result unless the hub assembly is allowed to rotate freely counterclockwise with respect to the cam 41. The ratchet mechanism 48,49 allows this, thus protecting the assembly from mechanical damage. When forward (clockwise) hub assembly rotation is resumed, the use of the single ratchet notch 49 assures proper indexing of the cam 41 with respect to the hub assembly.

Figure 11:
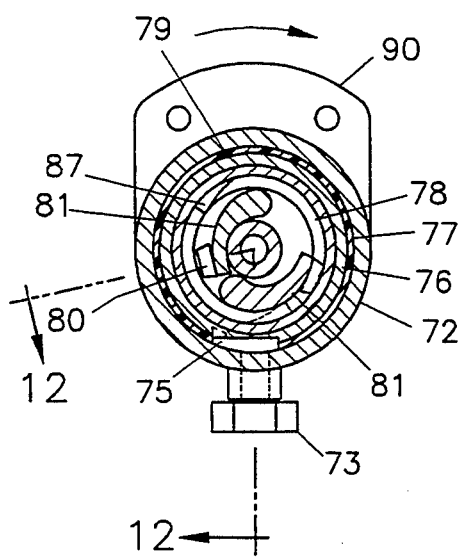
FIG. 11 is a view, mostly in section, showing the internal mechanism of a typical free-wheel sprocket hub, taken on line 11—11 of FIG. 12.
Figure 12:
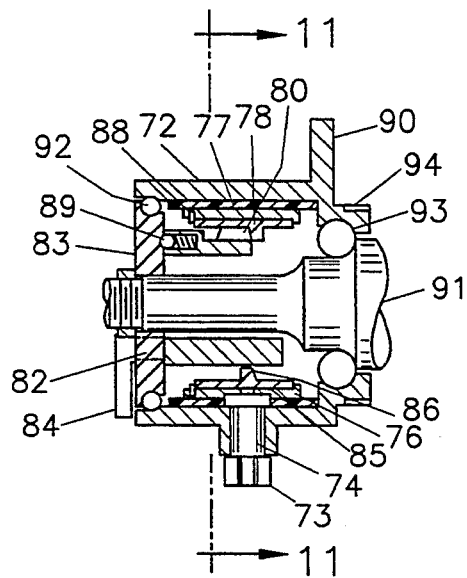
FIG. 12 is a view, mostly in section taken on line 12—12 of FIG. 11.

The free-wheel hub assembly is similar in operation to the chain ring hub assembly described hereinabove with reference to FIGS. 8, 9 and 10, and so is not described herein in full detail. The physical arrangement, however, shown in FIGS. 11 and 12, is somewhat different. Thus, with reference to FIGS. 11 and 12, the free-wheel hub assembly includes a free-wheel sprocket hub 72, a spur 73, a spur shaft 74, a spur crank arm and crank pin 75, a yoke 76, a yoke bushing 77, a cylindrical cam 78, a cam/yoke ratchet mechanism 79, cam followers 80, cam follower arms 81, cam follower arm shafts 82, a fixed hub plate 83, shift levers 84, cam grooves 85, cam groove slanted faces 86, cam groove radial ramps 87, cam retaining rings 88, and cam follower arm detents 89, all functioning in essentially the same manner as corresponding elements described hereinabove with respect to the chain ring hub of FIGS. 8–10.

There are, however, a number of differences in the free-wheel hub assembly of FIGS. 11 and 12 compared to the chain ring hub assembly of FIGS. 8–10, as will be apparent. The free-wheel sprocket fixed sectors are attached to the free-wheel hub flange 90 with bolts. The hub rotates on the fixed hub plate 83 and fixed rear wheel shaft 91 on ball bearings 92 and 93 respectively. The free-wheel hub 72 drives the rear wheel hub through a conventional ratchet mechanism 94. The rear wheel hub and its mounting on the shaft are conventional.

A significant variation from the chain ring assembly is in the cam follower 80 and cam surface orientation. The cam follower arms 81 in the free-wheel hub rotate outwardly toward the hub rim rather than inwardly toward the hub center, and the cam groove 85 is on the inner surface of the cam cylinder instead of on its outer surface. Also, the self-lubricating bushing 77 which permits axial sliding of the yoke 76 is on its outer rather than its inner circumference.

The tangential force imposed on the cam followers 80 as they meet the slanted face 86 of the cam groove 85 creates a clockwise torque as viewed in FIG. 11. This forces the cam followers 80 against the bottom surface of the cam groove 85 and tends to cause binding. To offset this effect, the cam followers 80 are in the shape of hollow truncated cones, and the cam groove 85 has matching tapered faces 86. This configuration creates a radial component of the force imposed on the cam follower by the cam groove which provides a torque that offsets the binding torque. However, the angle of the tapered face 86 and matching conical cam follower 80 is such that a slight engaging torque is produced once the cam follower 80 contacts the cam face 86.

In the various FIGURES referred to up to this point, the number of sprocket rings in a given stack has been either two or three. It will however be appreciated that larger numbers of sprocket rings are entirely feasible. One good arrangement, for example, uses five chain rings and five free-wheel sprockets. These can be selected to give a speed range of approximately 4 to 1, which, when used in combination with the control apparatus described hereinabove, includes nine ratios with a percentage change between successive ratios of less than 19% on the average.

Figures 13, 14:
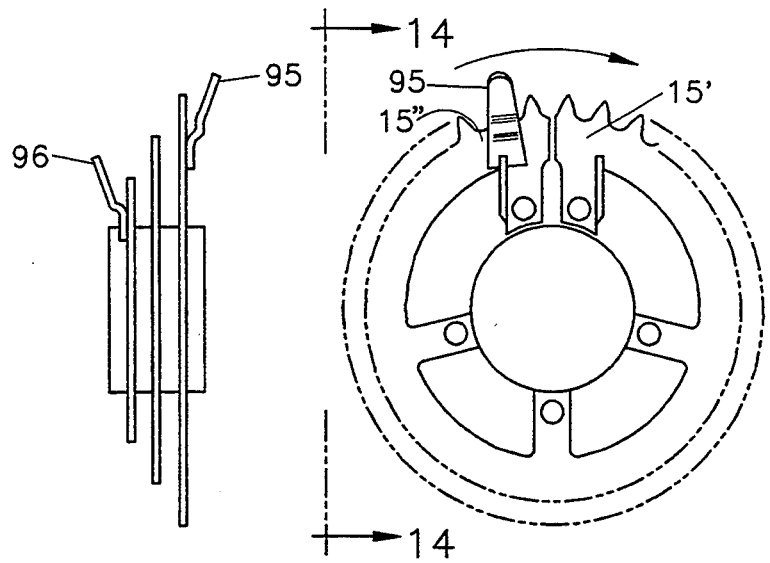
FIG. 13 is a side view of a flexible sector sprocket stack equipped with chain deflector tabs.
FIG. 14 is an end view taken on line 14—14 of FIG. 13.

Another feasible arrangement is a hybrid system utilizing a derailleur index shifting system with, for example, seven free-wheel sprockets on the rear wheel, and a three chain ring flexible sprocket sector system as described herein on the pedal shaft. In the latter system, the largest and the smallest chain rings are, as shown in FIGS. 13 and 14, equipped with deflector tabs 95 and 96, respectively, on their trailing resilient sectors 15", in order to divert the chain toward the middle of the stack and prevent it from running off the outer sprocket rings. These are used in combination with a simple operating lever and cable to each of the two shift levers to actuate shifting up or down. The operating levers are interlocked to prevent simultaneous operation of the upshift and downshift. Such a system comprises a simple arrangement embodying the invention, and provides the equivalent of what is commonly termed a "21-speed" system.

In contrast to the derailleur system, the mechanisms described hereinabove with reference to FIGS. 1–14 for transferring the chain from one sprocket ring to another do so without laterally forcing and thereby sensing the position of the chain. Nevertheless, in order to control the speed ratio of the chain drive, a means is needed for tracking about which sprocket rings the chain is and is to be entrained. Mechanisms described hereinbelow achieve that purpose, and also automatically select the sprocket rings to be entrained in such a manner that lateral deflection of the chain is minimized. This is accomplished by transferring the chain to an adjacent sprocket ring alternately on one sprocket ring stack and then the other.

Figure 15:
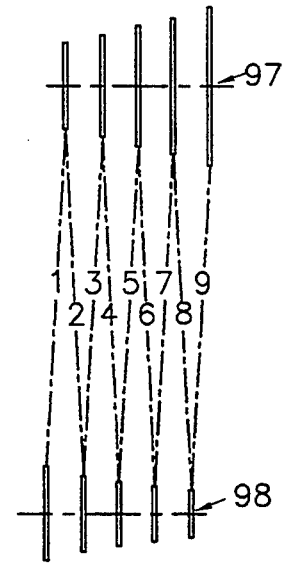
FIG. 15 is a schematic drawing of a typical chain transfer pattern in accordance with one embodiment of the invention.

Thus FIG. 15 schematically shows the chain path in a typical arrangement using five chain rings 97 and five free-wheel sprockets 98. The lowest drive ratio is designated as (1) and the highest ratio is designated as (9). As can be seen, shifting from (1) to (2) transfers the chain to the next smaller free-wheel sprocket 98, shifting from (2) to (3) transfers the chain to the next larger chain ring 97. This alternating transfer continues until ratio (9) is reached. Shifting down is done by the reverse pattern.

Figure 16:
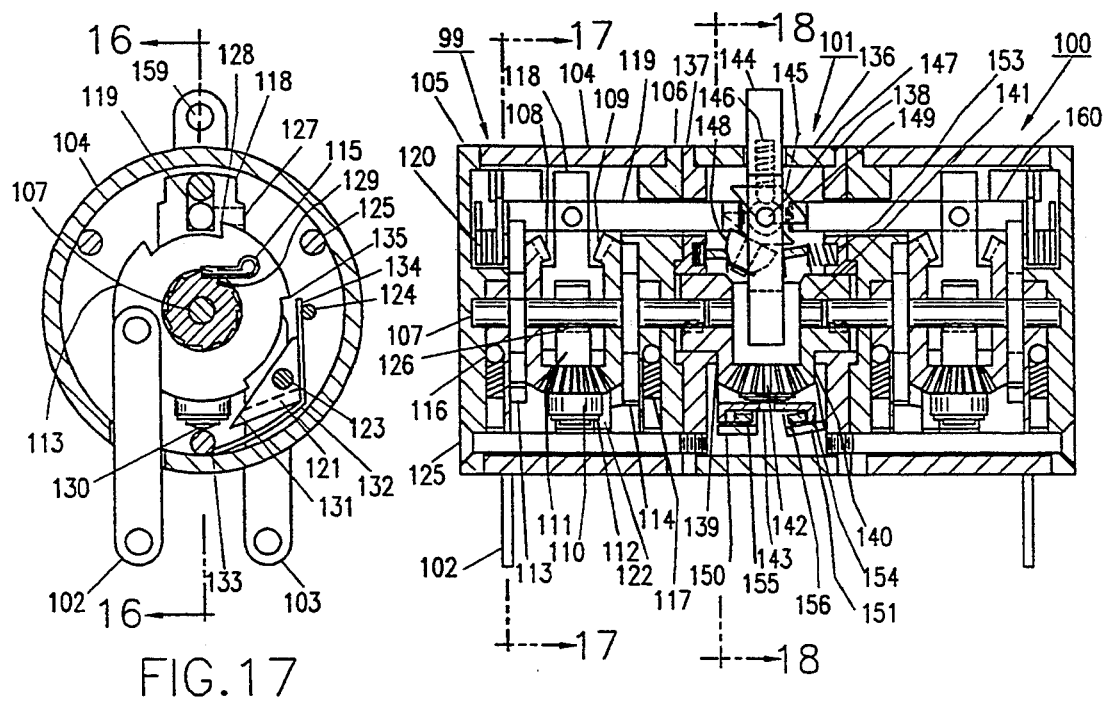
FIG. 16 is an internal view, mostly in diametrical cross-section, of a control module assembly of the invention, taken on line 16—16 of FIG. 17.
Figure 17:
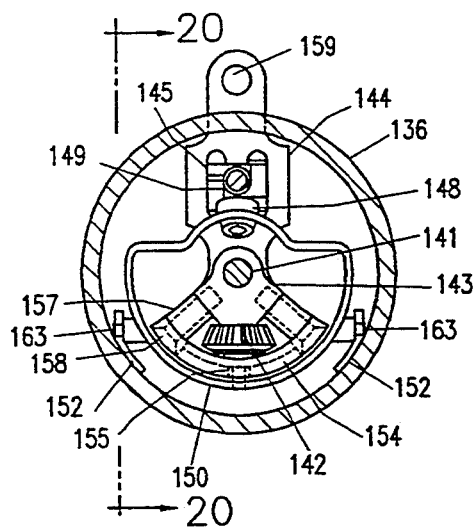
FIG. 17 is a view, mostly in section, taken on line 17—17 of FIG. 16 and depicting a shift control mechanism.
Figure 18:
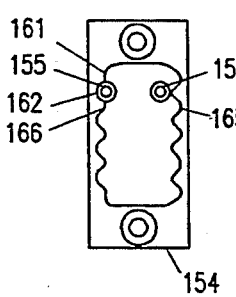
FIG. 18 is a view, mostly in section, taken on line 18—18 of FIG. 16 and depicting a shift selector mechanism.

A control mechanism is shown in FIGS. 16, 17 and 18, and in turn comprises three mechanisms or modules, a chain ring shift control mechanism or module 99, a free-wheel shift control mechanism or module 100, and a shift selector mechanism or module 101.

The shift control mechanisms or modules 99 and 100 are identical in operation. Accordingly, the description hereinbelow is primarily with reference to one of these, the chain ring shift control mechanism or module 99. Flexible cables are connected between shifter tongue 102 and 103 to the operating members or shift levers 59 and 60, respectively, on the chain ring hub 38 to control the actuator mechanism.

The chain ring shift control module 99 in particular comprises an outer shell 104, supporting hubs 105 and 106, center shaft 107, downshift differential bevel sun gear 108, upshift differential bevel sun gear 109, differential planetary pinion 110, pinion shaft arm 111, pinion retaining ring 112, downshift crank pin disk 113, upshift crank pin disk 114, two shifter ratchet pawls 115, sun gear spring and ball detents 116 and 117, a shift initiation arm in the form of a shifter crank 118 and a crank rod 119, two crank rod centering springs 120, downshift limit latch 121, upshift limit latch 122, and their pivot shafts 123 and latch backstop pins 124. The assembly is held together by screws 125. Pinion shaft arm 111 is keyed to center shaft 107 by key 126. Crank rod 119 is fastened to shifter crank 118 by set screw 127.

Shifting is initiated by rotating the shift initiation arm comprising shifter crank 118 and crank rod 119 about the center shaft 107. Assuming clockwise rotation, as viewed in FIG. 17, as crank rod 119 contacts notch surface 128 on downshift crank pin disk 113, the crank pin disk 113 rotates clockwise, thereby exerting an upward pull on shifter tongue 102. Through the connecting cable, clockwise torque is consequently applied to shift lever 59 at the chain ring hub. As previously described, a chain transfer is then accomplished, in this case to a smaller chain ring, to effect a downshift, i.e., a single step reduction in the drive ratio.

When that shift, or transfer, is completed, shift lever 59 is turned counterclockwise as previously described, exerting a downward pull on shifter tongue 102, which thereby causes downshift crank pin disk 113 to turn counterclockwise, and also crank rod 119 if it has not already been released and returned by centering spring 120. When downshift crank pin disk 113 is initially rotated clockwise, it is allowed to turn through an angle of slightly more than 30° as the cam follower in the chain ring hub bottoms in the cam groove. This allows formed leaf spring ratchet pawl 115 to engage the next clockwise oriented ratchet notch 129 on the hub of downshift sun gear 108. Up to this point, the sun gear is held stationary by detent 116. The counterclockwise rotation, again through 30°, caused by the shift completion, by means of the ratchet pawl, causes downshift sun gear 108 to rotate counterclockwise 30° until it reaches its next detented position, as the detent companion indentations in the sun gear hub are 30° apart. In accordance with the well known functioning of differential gearing, pinion shaft arm 111 consequently rotates 15° counterclockwise, driving center shaft 107, to which it is keyed, to rotate 15° counterclockwise about its own axis. It is this 15° rotation of the pinion shaft arm and the center shaft that registers the completion of one shift.

As illustrated in FIG. 15, this example involves four alternate chain ring and free-wheel shifts from high to low gear. Referring in particular to FIG. 17, four successive downshifts by the chain ring stack cause the pinion shaft arm 111 to rotate, in 15° increments, 60° counterclockwise from its extreme position at 7 o'clock to its other extreme position at 5 o'clock. This causes the rounded tip 130 of the pinion shaft arm to push against the slanted surface 131 of downshift limit latch 121. Leaf spring 132 is an integral part of the limit latch, and, by contact of its left end 133 with shell 104, causes the limit latch to assume a normal position wherein the right end 134 of the leaf spring 132 rests against latch backstop pin 124. When, however, the rounded tip 130 of the pinion shaft 123 is forced against the slanted surface 131 of the latch 121, the latch 121 is rotated counterclockwise until the right end 134 of the leaf spring 132 is forced against the rim of downshift crank pin disk 113. When the disk 113 has completed its 30° counterclockwise turn, notch face 135 engages the tip of the right end 134 of the leaf spring 132, which thereafter prevents clockwise rotation of the disk 113, and thereby prevents further downshifting of the chain ring stack. Thus, the chain is prevented from running off the smallest chain ring.

Chain ring upshifting is done by upshift crank pin disk 114 and its corresponding associated parts. Their orientation, from the viewpoint of FIG. 17, is a mirror image of those just described, and the rotation of the various parts is in the reverse direction of those just described. Thus, four successive chain ring upshifts cause the pinion shaft arm to rotate, in 15° increments, from 5 o'clock to 7 o'clock. Thereupon, upshift limit latch 122 prevents further upshifting, and the chain is thereby likewise prevented from running off the largest chain ring.

It will be appreciated from the foregoing that the discrete angular position of the pinion shaft arm upon any shift completion signals which sprocket in the stack engages the chain at that point.

In the free-wheel shift control mechanism or module 100, the downshift crank pin disk and associated parts are located in the outboard end of the module as assembled, and rotate in the same directions as their corresponding chain ring parts. The upshift parts are in the inboard end, and rotate in the same directions as their corresponding chain ring parts.

The alternating shift pattern is governed by the centrally located shift selector mechanism or module 101. Referring again to FIG. 16 and also to FIGS. 18, 19 and 20, the shift selector mechanism 101 comprises a shell 136, hubs 137 and 138, a chain ring differential sun gear 139, a free-wheel differential sun gear 140, a shift selector shaft 141, a shift selector differential pinion 142, a shift selector pinion shaft arm 143, a toggle arm 144, a toggle 145, a toggle spring and ball detent 146, a toggle shaft 147, a toggle roller 148 with its pin and retaining ring, crank rod rollers 149 and their retaining rings, a chain ring toggle yoke 150, a free-wheel toggle yoke 151, toggle yoke pivot plates 152, toggle yoke return springs 153, a toggle cam 154, a chain ring toggle cam follower 155, a free-wheel toggle cam follower 156, toggle cam spacers 157 and toggle cam screws 158 for attaching the cam to pinion shaft arm 143. The assembly is held together by screws (not shown) and the opposing two shifting modules are attached to it by their screws 125 which bolt through to hubs 137 and 138.

One end of a push-pull cable is attached to point 159 of the toggle arm 144. The other end of the cable is connected to the operating lever on the handlebar, as is described hereinbelow. As noted hereinabove, shifting is initiated by rotating the shift initiation arm comprising the shifter crank 118 and rod 119 about the central axis of the module 101. With the three-module assembly, this is actually accomplished by exerting a push (to the left) or a pull (to the right) by the cable at point 159, which in turn causes toggle arm 144 to rotate counterclockwise or clockwise, respectively, as viewed in FIGS. 17 and 18.

Assuming that the system is in high, i.e., ninth gear, by design toggle 145 is in the clockwise position as shown in FIG. 16. The toggle 145 has four lobes, and in this position, one lobe contacts the left side of chain ring crank rod 119 and the right side of free-wheel crank rod 160, both as viewed in FIGS. 17 and 18. Since the shifting system is in ninth gear, shifting any farther up is prevented by the action of the limit latch, as explained earlier. Thus only shifting down is possible. A clockwise torque as viewed in FIG. 17 exerted by the cable on toggle arm 144 causes clockwise rotation of the toggle arm and causes the toggle 145 to impose a clockwise rotation on chain ring crank rod 119 and chain ring shifter crank 118. This activates a one step downshift, to eighth gear, by the chain ring stack and consequently, as explained hereinabove, chain ring center shaft 107 turns 15° counterclockwise as the shift is completed. This in turn rotates shift selector chain ring differential sun gear 139, which is keyed to center shaft 107, 15° counterclockwise and, again by differential gearing action, rotates shift selector pinion shaft arm 143 7.5° counterclockwise about shift selector shaft 141. Toggle cam 154 is mounted on the pinion shaft arm and therefore rotates with it.

Figure 19:
FIG. 19 is a developed (rolled out flat) view of the surface of a toggle cam in the shift selector mechanism of FIGS. 16 and 18.
Figure 20:
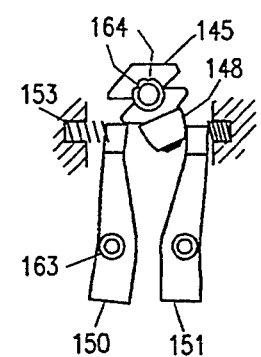
FIG. 20 is a partial sectional view taken on line 20—20 of FIG. 18.

With reference to FIG. 19, this causes the toggle cam contact point with chain ring cam follower 155 to shift from crest 161 to groove 162. As a result, the cam follower can fall into the groove. As seen in FIG. 18, chain ring toggle yoke 150 can pivot on its trunnions 163, which are free to turn in toggle yoke pivot plates 152. Chain ring toggle yoke 150 therefore turns clockwise as viewed in FIG. 20 due to the force exerted on it by toggle yoke return springs 153 until the cam follower is seated in the cam groove. In so doing, the yoke 150 exerts a force to the right as viewed in FIG. 20 against toggle roller 148 and causes the toggle 145 to assume its counterclockwise position, again as shown in FIG. 20. The two positions of the toggle 145 are set by toggle spring and ball detent 146 and its two mating conical holes 164 in the cylindrical barrel of the toggle 145. With the toggle in its counterclockwise position, one lobe contacts the right side of chain ring crank rod 119, as viewed in FIGS. 17 and 18, and one lobe contacts the left side of free-wheel crank rod 160.

Therefore, there are only two actions which it is possible for the toggle 145 to impose on the crank rods, either counterclockwise rotation of the chain ring crank rod, which causes shifting back up to ninth gear by the chain ring stack, or clockwise rotation of the free-wheel crank rod, which causes downshifting to seventh gear by the free-wheel sprocket stack. The latter causes 15° counterclockwise rotation of shift selector free-wheel sun gear 140 and 7.5° counterclockwise rotation of shift selector pinion arm 143. This causes another relocation of toggle cam 154 with respect to the toggle cam followers such that free-wheel cam follower 156 falls into groove 165 and chain ring cam follower 155 rides up on crest 166. The result is that free-wheel toggle yoke 151 is forced by its return springs to flip the toggle back to its clockwise position. The shift selector is then poised to allow the option of upshifting back to eighth gear by the free-wheel stack, or downshifting to sixth gear by the chain ring stack. In this manner, the shift selector module controls the alternating shift pattern to achieve the result depicted in FIG. 15. The discrete angular position of the shift selector pinion shaft arm and toggle cam at the completion of any shift indicates which sprocket in each stack is engaged by the chain at that moment.

If, after a shift has been completed and registered by one of the shift control modules, one of the crank rods is not forced to rotate again about the module's center axis, no further shifting occurs. However, if a torque is applied to toggle arm 144 by the push-pull cable, shifting continues. For example, if after downshifting to seventh gear, as described before, a clockwise torque is maintained on the toggle arm, the toggle imparts clockwise rotation to the chain ring crank rod and downshifting to sixth gear occurs. Upon shift completion, the toggle flips to its other position again, and downshifting continues as long as the torque on the toggle arm is maintained. Not until first gear is reached does downshifting then automatically stop. In this manner, automatic progressive shifting, either up or down, is achieved.

Figure 21:
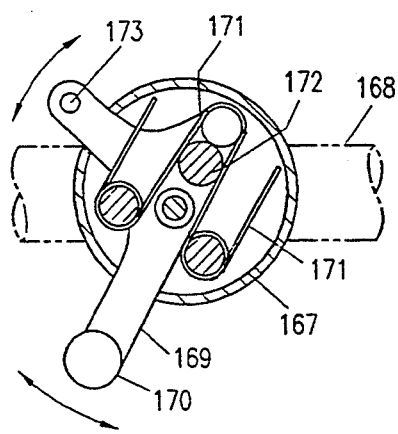
FIG. 21 is a top view, partly in section, of a typical rider's control unit for this invention.

It is stated hereinabove that a push-pull cable connects toggle arm point 159 to an operating lever. A typical rider's control unit is shown in FIG. 21. The FIG. 21 control unit has a housing 167, a means, such as a clamp, for mounting it to the frame or handlebar 168, a lever 169, knob 170, centering springs 171 and centering spring stop 172. The push-pull cable is connected at point 173, and typically, manual force (if the unit is mounted on the handlebar) is applied to knob 170. With the previously described arrangement, clockwise torque on the lever exerts a push on the cable and will activate an upshift, and counterclockwise torque pulls on the cable and activates a downshift.

It should be noted that each time a shift is completed, toggle arm 144 in the shift selector mechanism or module 101, and thereby operating lever 169, is returned to its neutral, i.e., center, position. However, as long as force on the knob is maintained, the lever is depressed again as soon as the selected cam follower in either the chain ring or free-wheel hub falls into its mating cylindrical cam groove.

The depression of the lever allows the rider to sense that a shift has been initiated, and as long as the rider continues pedaling, the shift is completed. If only a single shift is desired, manual force on knob 170 can be released as soon as full depression is felt. The lever is then returned to its neutral position by one or the other of the centering springs 171. Simultaneously in the applicable shift control mechanism or module 99 or 100, the crank rod is returned to neutral by one of its centering springs 120.

The foregoing describes an essentially automatic control mechanism for the flexible sprocket shifting system. However, a much simpler control method is feasible and entirely practical, as long as it does not become difficult or confusing for the rider to keep in mind which sprockets are momentarily entrained by the chain. That could certainly be the case with the five chain ring, five free-wheel sprocket arrangement just discussed.

It is mentioned hereinabove that a three chain ring flexible sector system could be used with a derailleur free-wheel system employing, for example, seven sprockets. The use of the deflector tabs 95 (FIGS. 13 and 14) on the chain rings can eliminate the need for a shift control system which automatically prevents the chain from running off the two outer sprockets. Furthermore, the use of only three chain rings would cause no confusion as to which chain ring is driving. Therefore, two simple manually operated levers, interlocked to prevent simultaneous operation of both, and each connected by a cable to one of the two shift levers 59 and 60 on the chain ring hub, can provide totally adequate control of shifting with the resilient sector chain rings. Since the conventional index shifting control for the free-wheel derailleur visually indicates which free-wheel is entrained, such a hybrid system is readily operable.

Figure 22:
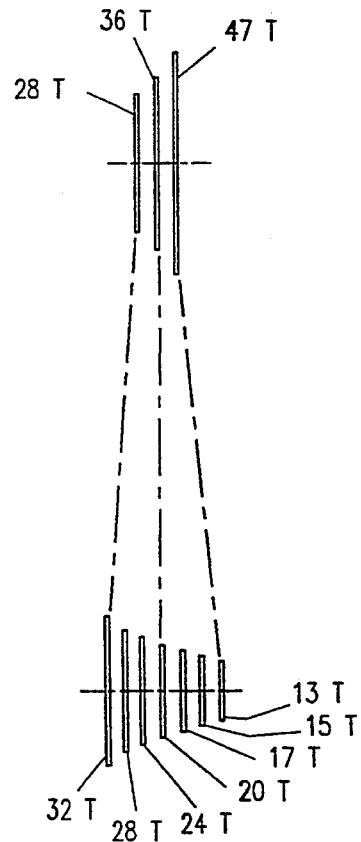
FIG. 22 is a schematic drawing of a typical chain and sprocket pattern for a hybrid system employing a variable ratio chain drive of the invention in combination with a conventional derailleur system.

Such a hybrid system is shown schematically in FIG. 22. The designations 28 T, etc., indicate the numbers of teeth on each sprocket. It is worth noting that, because the chain ring sectors are flexible, an extreme lateral chain deflection as would be obtained by, for example, engaging the 47-tooth chain ring with the 32-tooth free-wheel sprocket, could cause the chain to transfer back to the 36-tooth chain ring inadvertently. Likewise, a 28-tooth chain ring, 13-tooth free-wheel sprocket combination could cause the chain to jump up to the 36-tooth chain ring. However, these extreme combinations are not necessary and can therefore be avoided. For example, 47/32 gives a drive ratio of 1.47, but virtually the same ratio, 1.50, can be obtained by 36/24, which is entirely operable. Similarly, 28/13=2.15 is practically the same as 2.12 obtainable with 36/17, which poses no problem. Obviously therefore, these limitations of the hybrid system create no practical disadvantage. The shift control modules 99 and 100 can also be used and operated individually without the use of the shift selector module 101, by direct operator manipulation of the shifter module shift initiation arms. For example, a three chain ring flexible sector stack can be controlled by a shift control module designed for only three shift positions. In that case, the deflector tabs 95 would not be needed to keep the chain from running off the outer sprockets.

Figure 23:
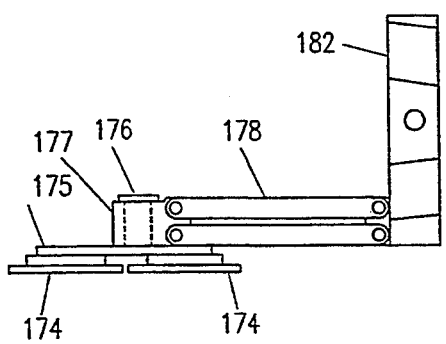
FIG. 23 is a top view of a chain tightener in accordance with the invention.
Figure 24:
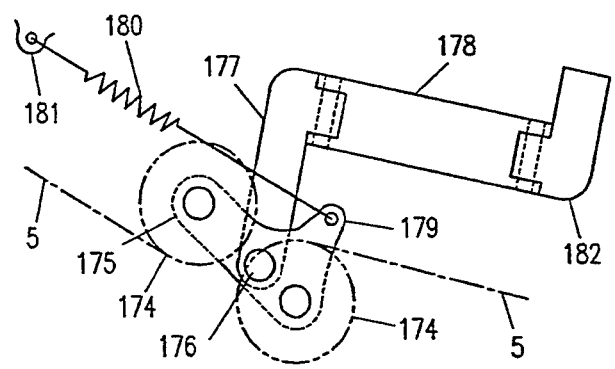
FIG. 24 is a side view of the chain tightener of FIG. 23.

In the hybrid system just described, the chain tightener is integral with the rear derailleur. However, with the full flexible sprocket drive system employing resilient sector sprockets on both the pedal shaft and the rear wheel, a tightener which floats laterally on the chain path, and thereby imposes no appreciable lateral force on the chain, preferably is used. Such a tightener is shown in FIGS. 23 and 24. The chain tightener of FIGS. 23 and 24 comprises a pair of small sprockets 174 which rotate freely about their axes and are mounted at the ends of an arm 175, which rotates on its pivot shaft 176 in pivot shaft housing 177. The housing 177 forms one of the four links in parallelogram linkage 178, which is free to articulate in a plane perpendicular to the plane of the sprockets 174 and the chain 5, which is S-wrapped around the sprockets 174 as shown. To the end of lever 179 which forms an integral part of arm 175 is attached one end of tension spring 180, and the other end of the spring is anchored at point 181 on the bicycle frame in the vicinity of the rear axle. The tightener assembly is attached to the bicycle frame by bracket 182. The relative orientation of spring, lever, arm, sprocket and chain path are such as to maintain a relatively constant but light tension on the slack, i.e., non-driving, pass of the chain. The advantage of the constant tension geometry is that, even in low gear, when the chain takeup is at the maximum, the slack pass of the chain 5 does not become loose and floppy as is often the case with conventional spring loaded tighteners.

The location of the chain tightener sprockets 174 in the plane of the chain path is such that the chain wrap around the chain rings is kept to little more than 180°, and to even less around the free-wheel sprockets. This is done to provide the cyclical unloading of the resilient sectors which is necessary to effect offset and offset release.

While specific embodiments of the invention have been illustrated and described herein, it is realized that numerous modifications and changes will occur to those skilled in the art. For example, while specific numbers of sprockets for the chain ring and the free-wheel assemblies have been mentioned, it is to be understood that other numbers of sprockets can be made to work equally well within the scope of this invention. It is therefore to be understood that the appended claims are intended to cover all such modifications and changes as fall within the true spirit and scope of the invention.

What is claimed is:

1. A variable ratio chain drive, comprising:
   a sprocket ring stack including at least two adjacent sprocket rings of differing diameters mounted for co-rotation on a sprocket axis;
   said sprocket rings being radially split in a common plane defined by the sprocket axis and a radial such that each sprocket ring has a leading and trailing resilient sector on either side of a sprocket ring split; and
   an actuator element for selectively deflecting said leading resilient sectors in one axial direction to a deflected position while deflecting said trailing resilient sectors in the opposite axial direction to a deflected position such that the leading resilient sector of one sprocket ring is in alignment with the trailing resilient sector of another sprocket ring at the common plane.

2. A variable ratio chain drive in accordance with claim 1, wherein said actuator element is selectively operable either to deflect said sectors to respective deflected positions such that the leading resilient sector of a relatively larger diameter sprocket ring is in alignment with the trailing resilient sector of a relatively smaller diameter sprocket ring, or to deflect said sectors to respective deflected positions such that the leading resilient sector of a relatively smaller diameter sprocket ring is in alignment with the trailing resilient sector of a relatively larger diameter sprocket ring.

3. A variable ratio chain drive in accordance with claim 1, wherein said sprocket ring stack comprises a driving sprocket ring stack.

4. A variable ratio chain drive in accordance with claim 1, wherein said sprocket ring stack comprises a driven sprocket ring stack.

5. A variable ratio chain drive in accordance with claim 1, which comprises a driving sprocket ring stack and a driven sprocket ring stack;

said driving sprocket ring stack including at least two adjacent driving sprocket rings of differing diameters mounted for co-rotation on a driving sprocket axis;

said driving sprocket rings being resilient and being radially split in a driving sprocket common plane defined by the driving sprocket axis and a driving sprocket radial such that each driving sprocket ring has a leading and a trailing resilient sector on either side of a driving sprocket ring split;

a driving sprocket actuator element for selectively deflecting said driving sprocket leading resilient sectors in one axial direction to a deflected position while deflecting said driving sprocket trailing resilient sectors in the opposite axial direction to a deflected position such that the leading resilient sector of one driving sprocket ring is in alignment with the trailing resilient sector of another driving sprocket ring at the driving sprocket common plane;

said driven sprocket ring stack including at least two adjacent driven sprocket rings of differing diameters mounted for co-rotation on a driven sprocket axis;

said driven sprocket rings being resilient and being radially split in a driven sprocket common plane defined by the driven sprocket axis and a driven sprocket radial such that each driven sprocket ring has a leading and a trailing resilient sector on either side of a driven sprocket ring split; and a driven sprocket actuator element for selectively deflecting said driven sprocket leading resilient sectors in one axial direction to a deflected position while deflecting said driven sprocket trailing resilient sectors in the opposite axial direction to a deflected position such that the leading resilient sector of one driven sprocket ring is in alignment with the trailing resilient sector of another driven sprocket ring at the driven sprocket common plane.

6. A variable ratio chain drive in accordance with claim 1, wherein:

said sprocket rings are mounted about a hub;

said resilient sectors have sprocket spokes extending radially inwardly towards said hub; and there are radial gaps between said sprocket spokes and said hub when a corresponding resilient sector is unloaded, said radial gaps being sized such that a given sprocket spoke contacts said hub when the corresponding resilient sector is subjected to the load of a chain.

7. A variable ratio chain drive in accordance with claim 6, wherein:

there are circumferential gaps in said sprocket rings which decrease as said resilient sector sprocket spokes contact said hub under chain load, a decrease in a circumferential gap resulting in a localized change in sprocket ring circumference; and changes in sprocket ring circumference as the resilient sector sprocket spokes contact said hub under chain load are insufficient to interfere significantly with proper meshing of the chain with the sprocket ring.

8. A variable ratio chain drive in accordance with claim 1, wherein said actuator element is operable to deflect said sectors only during a portion of a rotational cycle when said flexible sectors are not subjected to the load of a chain.

9. A variable ratio chain drive in accordance with claim 1, wherein said sprocket rings have circumferential teeth for engaging rollers of a chain which is transferred from one sprocket ring to another sprocket ring as said sprocket ring stack rotates on the sprocket axis while said resilient sectors are in the respective deflected positions, each of said teeth having a leading edge and a trailing edge, and said teeth being angularly oriented with respect to the common plane such that the rollers of the chain, when transferring from the leading resilient sector of any given sprocket ring to the trailing resilient sector of an adjacent sprocket ring, always contact the leading edges of trailing resilient sector upon initial contact with the trailing resilient sector, regardless of whether the given sprocket ring is of a larger or a smaller diameter compared to the adjacent sprocket ring.

10. A variable ratio chain drive in accordance with claim 1, wherein:

said sprocket ring stack includes two outer sprocket rings at axially opposite ends of said stack; and which further comprises a deflector tab on the trailing flexible sector of each of said outer sprocket rings so located and oriented as to prevent a chain from running off in the event said resilient sectors remain in the deflected position after the chain has been shifted to either of said outer sprocket rings.

11. A variable ratio chain drive in accordance with claim 1, wherein said sprocket ring stack is employed on one axis in combination with and interconnected by a chain to a variable speed drive on another axis which does not employ a stack of resilient radially split sprocket rings.

12. A variable ratio chain drive in accordance with claim 11, where said variable speed drive on another axis is selected from the group consisting of a derailleur system and a planetary gear system.

13. A variable ratio chain drive in accordance with claim 1, which further comprises:

an actuator mechanism connected to said actuator element, said actuator mechanism having at least one operating member and operable, when said at least one operating member is urged in a direction indicating a shift is desired, to cause said actuator element to deflect said resilient sectors while said resilient sectors are not subjected to the load of a chain such that a chain transfer subsequently occurs when said resilient sectors are subjected to chain load, and to subsequently release said resilient sectors while said resilient sectors are again not subjected to the load of a chain.

14. A variable ratio chain drive in accordance with claim 13, wherein said actuator mechanism is further operable, upon release of said resilient sectors, to move said at least one operating member back to a neutral position, indicating that chain transfer has been completed.

15. In combination with a variable ratio chain drive in accordance with claim 14, a shift control mechanism operably connected to said at least one operating member, said shift control mechanism operable, in response to a control input, to urge said at least one operating member to indicate a shift is desired, operable to respond to movement of said at least one operating member back to a neutral position to record the completion of a shift and to track the particular sprocket ring to which the chain has been transferred, and operable to inhibit further urging of said operating member when the chain has reached an outer sprocket ring of said stack.

16. A variable ratio chain drive in accordance with claim 14, wherein said actuator mechanism has a pair of operating members, one of said operating members effecting downshifts and subsequently indicating that a chain transfer for downshift has been completed, and the other of said operating members effecting upshifts and subsequently indicating that a chain transfer for upshift has been completed.

17. In combination with a variable ratio chain drive in accordance with claim 16, a shift control mechanism comprising:

a differential gear set comprising two bevel sun gears having a sun gear common axis, said sun gears engaging a pinion rotatably mounted on a shaft arm, said shaft arm rotatably mounted on the sun gear common axis, said sun gears having hubs with indentations spaced at equal angular intervals comprising detents which tend to hold the sun gears at discrete angular positions;

a pair of crank pin drivers, each fitted with a crank pin, rotatably and concentrically mounted on respective sun gear hubs with a ratchet device coupling each crank pin driver to its respective sun gear hub such that each crank pin driver is free to rotate freely on its respective sun gear hub in a free-turning direction and rotatably drives the respective sun gear in a driving direction, the ratchet devices having drive engagement positions spaced at the same angular intervals as the detent indentations, and the driving directions of the crank pin drivers being rotationally opposite with respect to each other;

said crank pins being connected to respective ones of said operating members such that rotating each crank pin driver through the angular interval in the free-turning direction moves the operating member so as to cause a shift, and such that movement of the operating member back to the neutral position upon shift completion causes rotation of the crank pin driver in the driving direction through the discrete angular interval to drive the corresponding sun gear through the same angle, thereby rotating said pinion shaft arm through one half the angular interval to register completion of the shift, and such that the rotation by the pinion shaft arm to register a shift in one direction can be offset by an equal and opposite rotation of a shift in the other direction so that the angular position of said pinion shaft arm upon any shift completion indicates which sprocket of said sprocket stack is currently engaged by the chain;

two latches, one for each of said crank pin drivers, located so as to be actuated by said pinion shaft arm when it reaches a limit position such that said latches engage said crank pin drivers to prevent initiation of a shift which would cause the chain to run off of either outer sprocket in said stack;

a shift initiation arm pivoting about the sun gear common axis and arranged for engaging said crank pin drivers such that rotation in either direction of said shift initiation arm about the sun gear common axis causes rotation of one crank pin driver or the other to initiate a shift.

18. A variable ratio chain drive in accordance with claim 1, wherein said actuator element comprises a rotatable spur having a radially-oriented axis of rotation lying in the common plane where said sprocket rings are radially split, and having two diametrically-opposed spur teeth straddling the common plane, one of said spur teeth projecting into a space between two adjacent leading resilient sectors of said sprocket ring stack and the other of said spur teeth projecting into a space between two adjacent trailing resilient sectors of said sprocket ring stack.

19. A variable ratio chain drive in accordance with claim 18, which further comprises:

a hub about which said sprocket rings are mounted, said hub having a cylindrical wall defining an interior space; and a spur shaft on said spur, said spur shaft extending radially inwardly through an aperture in said cylindrical wall for engagement with an actuator mechanism within the interior space.

20. A variable ratio chain drive in accordance with claim 19, wherein said actuator mechanism is operable, when a shift is desired, to rotate said spur on the spur axis so as to cause sprocket resilient sector deflection and subsequent resilient sector release while said resilient sectors are cyclically not subjected to the load of a chain.

21. A variable ratio chain drive in accordance with claim 19, wherein said spur shaft is attached to a crank having a crank pin, said crank pin engaging said actuator mechanism.

22. A variable ratio chain drive in accordance with claim 21, wherein said actuator mechanism within the hub interior space comprises:

a yoke having a yoke outer rim in engagement with said crank pin so as to be driven in rotation about a common axis with said hub by said crank pin as said crank pin rotates with said hub, said yoke being free to move back and forth in a direction parallel to the common axis such that axial yoke movement is converted to back and forth rotation of the spur crank about said spur axis of rotation to cause said spur teeth to deflect said leading and trailing resilient sectors;

a cylindrical cam having a pair of grooves in a cylindrical surface, said cam being mounted on said yoke concentrically with the common axis of said hub and said yoke, and being axially restrained by said yoke but free to rotate on said yoke about the common axis;

a spring-loaded ratchet and pawl mechanism mounted between mating cylindrical walls of said yoke and said cam for transmitting driving force from said yoke to said cam so as to rotationally drive said cam in a normal rotational direction only, while allowing said cam to rotate on said yoke relative to said yoke in an opposite rotational direction, the ratchet of said ratchet and pawl mechanism having only one notch so that, when driven, said cam always maintains the same relative angular position with respect to said yoke;

a pair of cam followers having rollers arranged generally with their axes radially disposed with respect to said cam and mounted on cam follower arms for selective engagement with the cam grooves, said cam follower arms being attached to cam follower arm shafts whose axes are parallel to the axis of said hub but not concentric therewith, said cam follower arm being rotatably mounted but axially restrained with reference to a stationary endpiece comprising an end of the hub interior space, the ends of said cam follower arm shafts opposite to said cam follower arms extending outside said hub, selectively controlled rotation of said either of said cam follower arm shafts effecting engagement of the corresponding cam follower with the corresponding cam groove;

the cam grooves being shaped and oriented such that, when one of the cam grooves is engaged by the corresponding one of said cam followers, axial displacement of said cam results so as to cause sprocket resilient sector deflection and subsequent resilient sector release while said resilient sectors are cyclically not subjected to the load of a chain, and such that the engaging cam follower causes said flexible sectors while in the deflected position to transfer the chain from one sprocket to another; and a respective pair of ramps on said cam grooves, said ramps being arranged to eject said cam followers from the cam groove to effect resilient sector release.

23. A variable ratio chain drive in accordance with claim 22, wherein ejection of one of said cam followers from the corresponding one of the grooves by the respective one of said pair of ramps causes a rotation of the end of the corresponding cam follower arm shaft extending outside said hub which serves to indicate that chain transfer has been completed.

24. A variable ratio chain drive in accordance with claim 5, which further comprises:

a driving sprocket actuator mechanism connected to said driving sprocket actuator element, and a driven sprocket actuator mechanism connected to said driven sprocket actuator element;

said driving sprocket actuator mechanism having at least one driving sprocket operating member and operable, when said at least one driving sprocket operating member is urged in a direction indicating a shift is desired, to cause said driving sprocket actuator element to deflect said driving sprocket resilient sectors while said driving sprocket resilient sectors are not subjected to the load of a chain such that a chain transfer subsequently occurs when said driving sprocket resilient sectors are subjected to chain load, to subsequently release said driving sprocket resilient sectors while said driving sprocket resilient sectors are again not subjected to the load of a chain, and, upon release of said driving sprocket resilient sectors, to move said at least one driving sprocket operating member back to a neutral position indicating that chain transfer has been completed; and said driven sprocket actuator mechanism having at least one driven sprocket operating member and operable, when said at least one driven sprocket operating member is urged in a direction indicating a shift is desired, to cause said driven sprocket actuator element to deflect said driven sprocket resilient sectors while said driven sprocket resilient sectors are not subjected to the load of a chain such that a chain transfer subsequently occurs when said driven sprocket resilient sectors are subjected to chain load, to subsequently release said driven sprocket resilient sectors while said driven sprocket resilient sectors are again not subjected to the load of a chain and, upon release of said driven sprocket resilient sectors, to move said at least one driven sprocket operating member back to a neutral position indicating that chain transfer has been completed.

25. In combination with a variable ratio chain drive in accordance with claim 24:

a driving sprocket shift control mechanism operably connected to said at least one driving sprocket operating member, said driving sprocket shift control mechanism operable, in response to a control input to urge said at least one driving sprocket operating member to indicate a shift is desired, operable to respond to movement of said at least one driving sprocket operating member back to a neutral position to record the completion of a shift and to track the particular sprocket ring on said driving sprocket to which the chain has been transferred, and operable to inhibit further urging of said driving sprocket operating member when the chain has reached an outer sprocket ring of said driving sprocket stack;

a driven sprocket shift control mechanism operably connected to said at least one driven sprocket operating member, said driven sprocket shift control mechanism operable, in response to a control input to urge said at least one driven sprocket operating member to indicate a shift is desired, operable to respond to movement of said at least one driven sprocket operating member back to a neutral position to record the completion of a shift and to track the particular sprocket ring on said driven sprocket to which the chain has been transferred, and operable to inhibit further urging of said driven sprocket operating member when the chain has reached an outer sprocket ring of said driven sprocket stack; and a shift selector mechanism connected to each of said shift control mechanisms and operable to effect a shifting sequence which alternately employs said driving sprocket ring stack and said driven sprocket ring stack for successive shifts in a given driving ratio direction.

26. A combination in accordance with claim 25, wherein said shift selector mechanism comprises:

a differential gear set comprising two bevel sun gears having a sun gear common axis and having respective hubs, said sun gear engaging a pinion rotatably mounted on a shaft arm, said shaft arm rotatably mounted on the sun gear common axis, and each sun gear being rotatably driven by a respective one of said shift control mechanisms such that each sun gear assumes discrete angular positions which indicate the specific sprocket in the stack corresponding to each said sun gear that is engaged by the chain and such that the discrete angular positions of said pinion shaft arm indicate which respective sprocket in each stack is engaged by the chain;

a cam coupled to and driven by said pinion shaft arm to rotate about the sun gear common axis, suitably shaped to engage two cam followers, each of which can move independently of the other, the shape of said cam being such that each of the discrete positions it assumes as a result of being coupled to the pinion shaft arm causes the respective positions of said two cam followers to collectively signal which of the two sprocket stacks is to be utilized to effect the next shift, whether that shift is up or down in driving ratio;

a pair of yokes, each of said cam followers being rotatably mounted to a corresponding one of said yokes, said yokes pivoting about respective fulcrums to form levers for transmitting translational motion of said cam followers to another point;

a shaft rotatably mounted in and concentric with said sun gear hubs, said shaft supporting said pinion shift arm and also supporting a shift arm rotatable thereon, said shift arm attachable to a user operation device for rotation back and forth to activate up or down shifting as desired by a user; and a toggle fitted in said shift arm, said toggle pivotable about an axis oriented in the plane of rotation of said shift arm, said toggle comprising lobes and a detent arrangement which allows the lobes to assume two discrete positions, such positions to be determined by contact of a roller attached to said toggle with the cam operated yokes, so that the two positions of the lobes poise the toggle to selectively activate one or the other of said shift control mechanisms to effect the desired upshift or downshift.

27. A chain tightener which floats laterally with the slack pass of a chain in a variable ratio chain drive including driving and driven sprockets, at least one of said sprockets comprising a sprocket ring stack having at least two sprocket rings of differing diameters mounted for co-rotation on a sprocket axis, the sprocket rings being resilient and being radially split in a common plane defined by the sprocket axis and a radial such that each sprocket ring has a leading and trailing resilient sector on either side of a sprocket ring split, and an actuator element for selectively deflecting the leading resilient sectors in one axial direction to a deflected position while deflecting the trailing resilient sectors in the opposite axial direction to a deflected position such that the leading resilient sector of one sprocket ring is in alignment with the trailing resilient sector of another sprocket ring at the common place, said chain tightener comprising:

a pair of chain tightener sprockets mounted on an arm having a pivot for pivoting about an axis perpendicular to the plane of the chain path, said arm being spring loaded in such a way as to maintain a light but near constant chain tension; and said arm and its pivot being mounted on one link of a freely articulating laterally oriented parallelogram linkage so located such that chain wrap around the driving and driven sprockets is approximately 180° or less on each, so as to allow for cyclical relief from chain load for the resilient sectors during deflection and release of the resilient sectors.

* * * * *